(12) United States Patent  
Berkes et al.

(10) Patent No.: US 7,857,323 B1
(45) Date of Patent: Dec. 28, 2010

(54) MULTI-PIECE SEAL

(75) Inventors: Danielle E. Berkes, Windsor (CA); William J. Forsythe, Jr., Sterling Heights, MI (US); James R. Osborne, Davisburg, MI (US); Darron G. Peddle, Greenville, NC (US)

(73) Assignees: TI Group Automotive Systems, L.L.C., Warren, MI (US); Parker-Hannifin Corporation, Cleveland, OH (US)

( * ) Notice: Subject to any disclaimer, the term of this patent is extended or adjusted under 35 U.S.C. 154(b) by 1344 days.

(21) Appl. No.: 11/361,399

(22) Filed: Feb. 24, 2006

(51) Int. Cl.
*F16J 15/02* (2006.01)

(52) U.S. Cl. ....................... 277/567; 277/647
(58) Field of Classification Search ................. 277/438, 277/530, 567, 589, 547, 910, 553–556, 644, 277/650–652, 647
See application file for complete search history.

(56) References Cited

U.S. PATENT DOCUMENTS

| | | | |
|---|---|---|---|
| 3,467,448 A | 9/1969 | Galle | |
| 3,788,654 A | 1/1974 | Mandley | |
| 3,918,726 A | 11/1975 | Kramer | |
| 4,248,439 A * | 2/1981 | Haslett | 277/380 |
| 4,262,914 A | 4/1981 | Roley | |
| 4,344,629 A | 8/1982 | Oelke | |
| 4,364,572 A | 12/1982 | Yamamoto et al. | |
| 4,426,091 A | 1/1984 | Baylor | |
| 4,568,090 A | 2/1986 | Westemeier | |
| 4,687,212 A * | 8/1987 | Timpson et al. | 277/556 |
| 5,265,890 A | 11/1993 | Balsells | |
| 5,860,680 A | 1/1999 | Drijver et al. | |
| 5,879,010 A | 3/1999 | Nikanth et al. | |
| 6,007,070 A * | 12/1999 | Heathcott et al. | 277/510 |
| 6,012,904 A | 1/2000 | Tuckey | |
| 6,091,175 A | 7/2000 | Kinsinger | |
| 6,305,483 B1 * | 10/2001 | Portwood | 175/371 |
| 6,332,555 B1 | 12/2001 | Stangier | |
| 6,357,618 B1 | 3/2002 | Kloess et al. | |
| 6,357,759 B1 | 3/2002 | Azuma et al. | |
| 6,419,236 B1 | 7/2002 | Janian | |
| 6,450,502 B1 | 9/2002 | Bachl et al. | |
| 6,497,415 B2 | 12/2002 | Castleman et al. | |
| 6,502,826 B1 | 1/2003 | Schroeder et al. | |
| 6,533,288 B1 | 3/2003 | Brandner et al. | |
| 6,691,888 B2 | 2/2004 | Moser et al. | |
| 6,698,613 B2 | 3/2004 | Goto et al. | |
| 6,755,422 B2 | 6/2004 | Potter | |
| 6,883,804 B2 * | 4/2005 | Cobb | 277/549 |
| 2002/0158419 A1 | 10/2002 | Zitting et al. | |

* cited by examiner

*Primary Examiner*—Vishal Patel
(74) *Attorney, Agent, or Firm*—Reising Ethington P.C.

(57) ABSTRACT

A multi-piece seal preferably for a sealed joint of a fuel tank assembly. An outer member has in an uncompressed state a cross-sectional shape defined by substantially semi-circular-shaped portions that define a substantially semi-circular channel and that terminate in free ends. An inner member is disposed at least partially in the channel of the outer member and has in an uncompressed state a substantially round cross-sectional shape. Preferably, the outer member is composed of a permeation-resistant material, and the inner member is composed of a relatively less expensive material capable of better elasticity performance at relatively lower temperatures compared to the outer member. The outer member preferably has lobed ends and the inner member preferably includes one or both of a stress-relieving feature or an orientation feature to orient the inner member relative to the outer member.

9 Claims, 4 Drawing Sheets

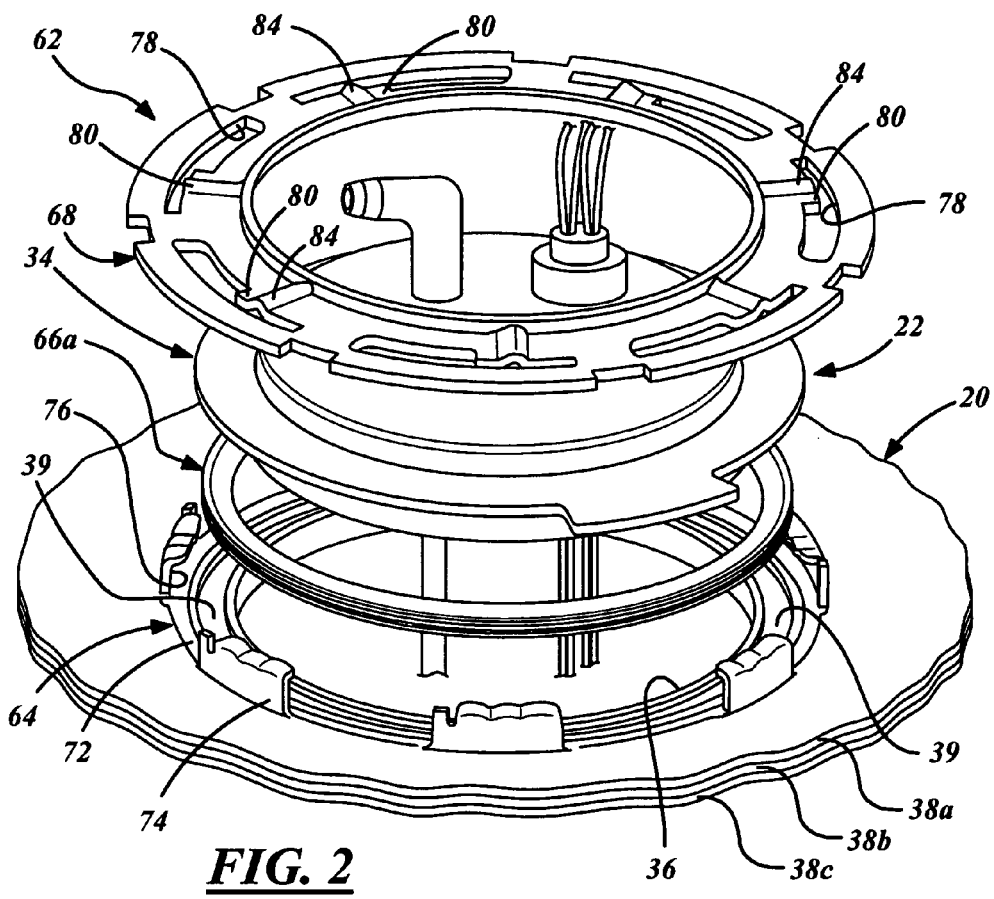
*FIG. 2*
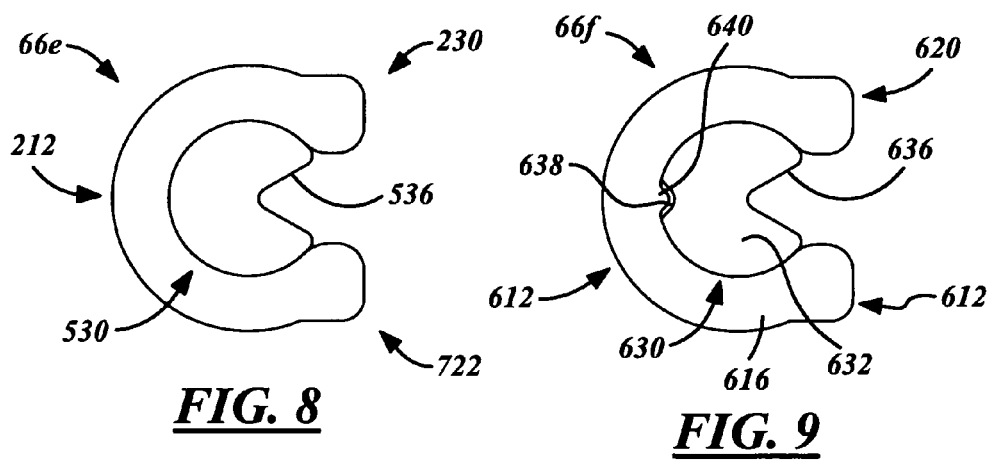
*FIG. 8*  *FIG. 9*

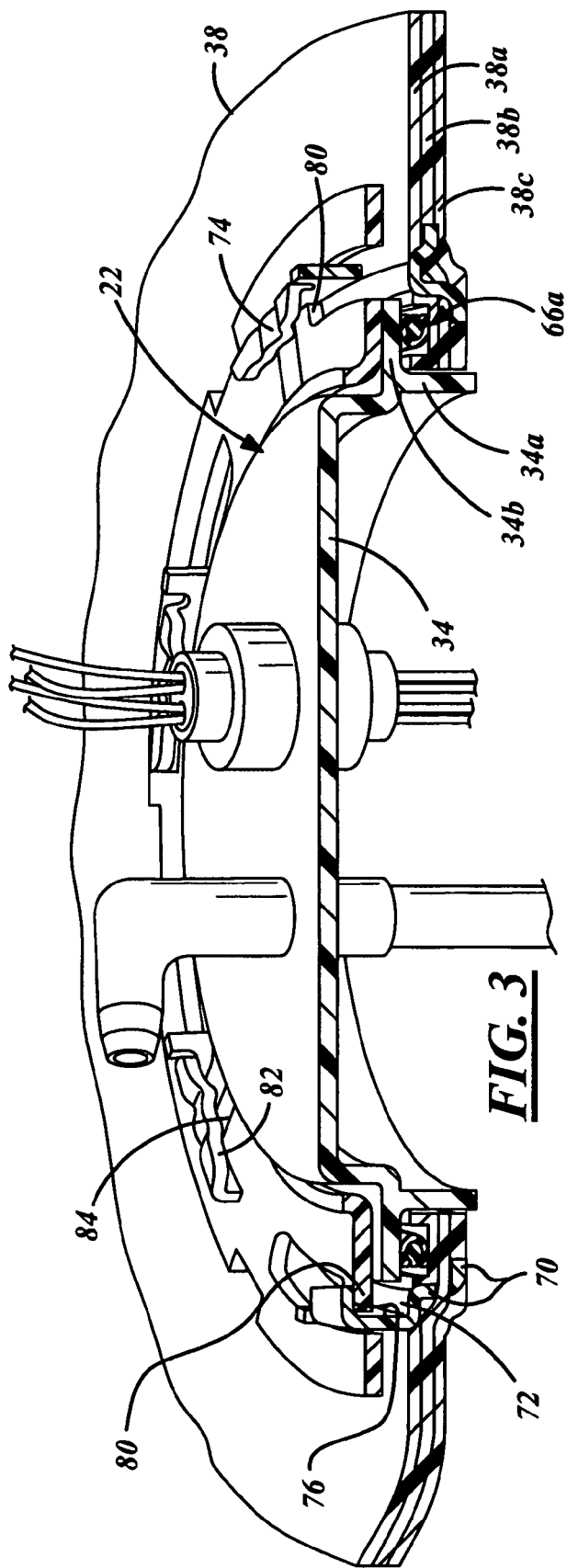
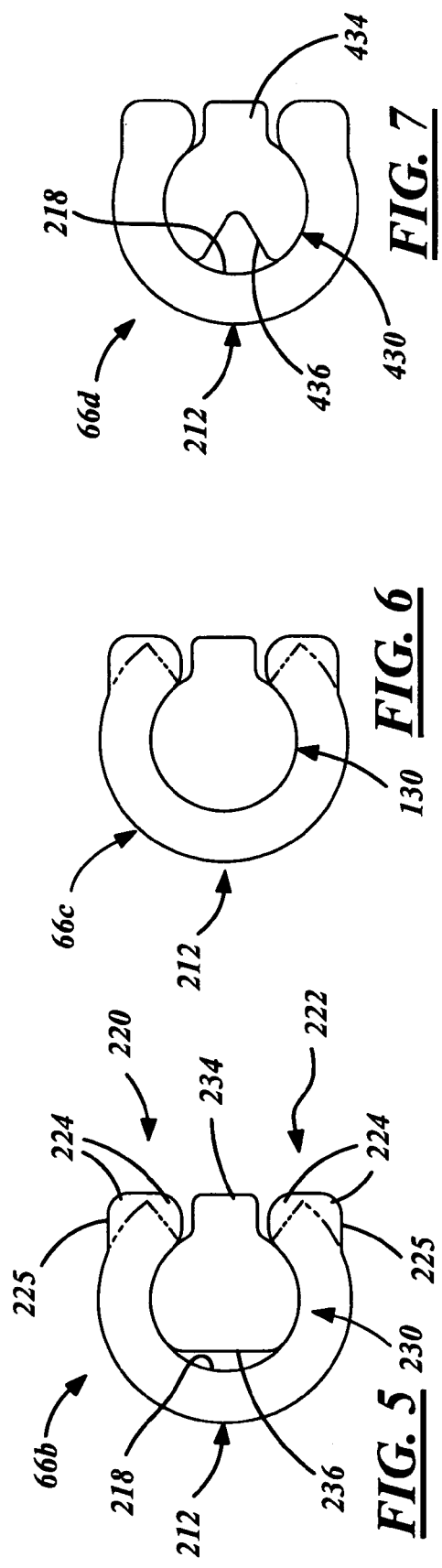

MULTI-PIECE SEAL

FIELD OF THE INVENTION

This invention relates generally to automotive fuel system polymeric seals, and more particularly to multiple piece polymeric seals having inner members disposed within outer members.

BACKGROUND OF THE INVENTION

Automotive fuel system polymeric seals are deformable components that are widely used in many different applications to make a pressure-tight joint between parts, and include radial seals and axial seals. In use, radial seals are compressed in a radial direction perpendicular to a seal centerline on radially inside and outside surfaces of the radial seal's cross section, whereas axial seals are compressed in an axial direction parallel to a seal centerline on axially opposed surfaces of the axial seal's cross section. Axial seals, in particular, are widely used to seal openings of containers.

For example, axial seals are often used to seal an opening in a fuel tank and are disposed in a flange-type joint between a mounting flange of a fuel delivery module and an outer surface of the fuel tank. Unfortunately, however, an axial seal may not provide a substantially permeation-free joint between the mounting flange and the fuel tank. More specifically, due to relatively high volatility, hydrocarbons quickly vaporize from liquid fuel in the fuel tank and may escape to the atmosphere through the flange-type joint, if it is not suitably sealed. In fact, volatile fuel vapors may permeate right through the axial seal itself, in an otherwise pressure-tight sealed joint.

To address such leakage, the California Air Resources Board (CARB) has adopted regulations requiring vehicles to operate with a combination of a Super Ultra Low Emission Level (SULEV) and zero evaporative emissions of fuel, constituting a Partial Zero Emission Vehicle (PZEV). Zero evaporative emissions means no gases may be emitted from the vehicle's fuel tank or other fuel delivery systems.

One approach to providing a permeation-free flange-type joint to comply with the PZEV regulations is to use a special low-permeation type of seal material to seal a joint. But such materials are typically cost prohibitive for many applications, are relatively hard and, thus, difficult to compress during assembly, and usually exhibit low elasticity at low temperature.

SUMMARY OF THE INVENTION

A multi-piece seal provides a pressure-tight seal against liquid leaks between two components, economically resists permeation of vapors through the multi-piece seal itself, and preferably reduces likelihood of seal members twisting relative to one another and the likelihood of the seal itself twisting between the two components. The multi-piece seal includes an outer member preferably composed of a permeation-resistant material having a given low-temperature elasticity performance, and an inner member preferably composed of a relatively less expensive material with a relatively better low-temperature elasticity performance.

The outer member includes, in an uncompressed state, a cross-sectional shape defined by semi-circular-shaped portions that define a semi-circular channel and that terminate in free ends. The inner member is disposed in the channel of the outer member and has, in an uncompressed state, a substantially round cross-sectional shape, which preferably includes one or both of a stress-relieving feature or an orientation feature to orient the inner member relative to the outer member. The multi-piece seal is preferably adapted for use as an axial face seal in a sealed joint between a wall of a fuel tank and a flange of a fuel delivery module.

At least some of the objects, features and advantages that may be achieved by at least certain forms of the invention include providing a seal that is readily adaptable to various sealing applications including axial face seals in sealed joints between fuel tanks and fuel modules; economically balances use of low-permeation material with lower cost low-temperature performance material; suitably resists liquid or vapor permeation therethrough and resists leakage thereby; resists roll or extrusion; is of relatively simple design and economical manufacture and assembly, durable, reliable and in service has a long useful life.

Of course, other objects, features and advantages will be apparent in view of this disclosure to those skilled in the art. Various other seals and sealing applications embodying the invention may achieve more or less than the noted objects, features or advantages.

BRIEF DESCRIPTION OF THE DRAWINGS

These and other objects, features and advantages of the present invention will be apparent from the following detailed description of the preferred forms and best mode, appended claims, and accompanying drawings in which:

FIG. 2 is an exploded perspective view of the sealed joint of FIG. 1 including the multi-piece seal;

FIG. 3 is an assembled, perspective, cross-sectional view of the sealed joint of FIG. 1 including the multi-piece seal;

FIG. 5 is a cross-sectional view of a portion of a second form of a multi-piece seal having modified outer and inner members;

FIG. 6 is a cross-sectional view of a portion of a third form of a multi-piece seal having the modified outer member shown in FIG. 5 with the inner member shown in FIG. 4;

FIG. 7 is a cross-sectional view of a portion of a fourth form of a multi-piece seal having the modified outer member shown in FIG. 5 with a modified inner member;

FIG. 8 is a cross-sectional view of a portion of a fifth form of a multi-piece seal having the modified outer member of FIG. 5 with another modified inner member; and FIG. 9 is a cross-sectional view of a portion of a sixth form of a multi-piece seal having a further modified outer member with a further modified inner member.

DETAILED DESCRIPTION OF THE PREFERRED FORMS

Overview

Figure 1:
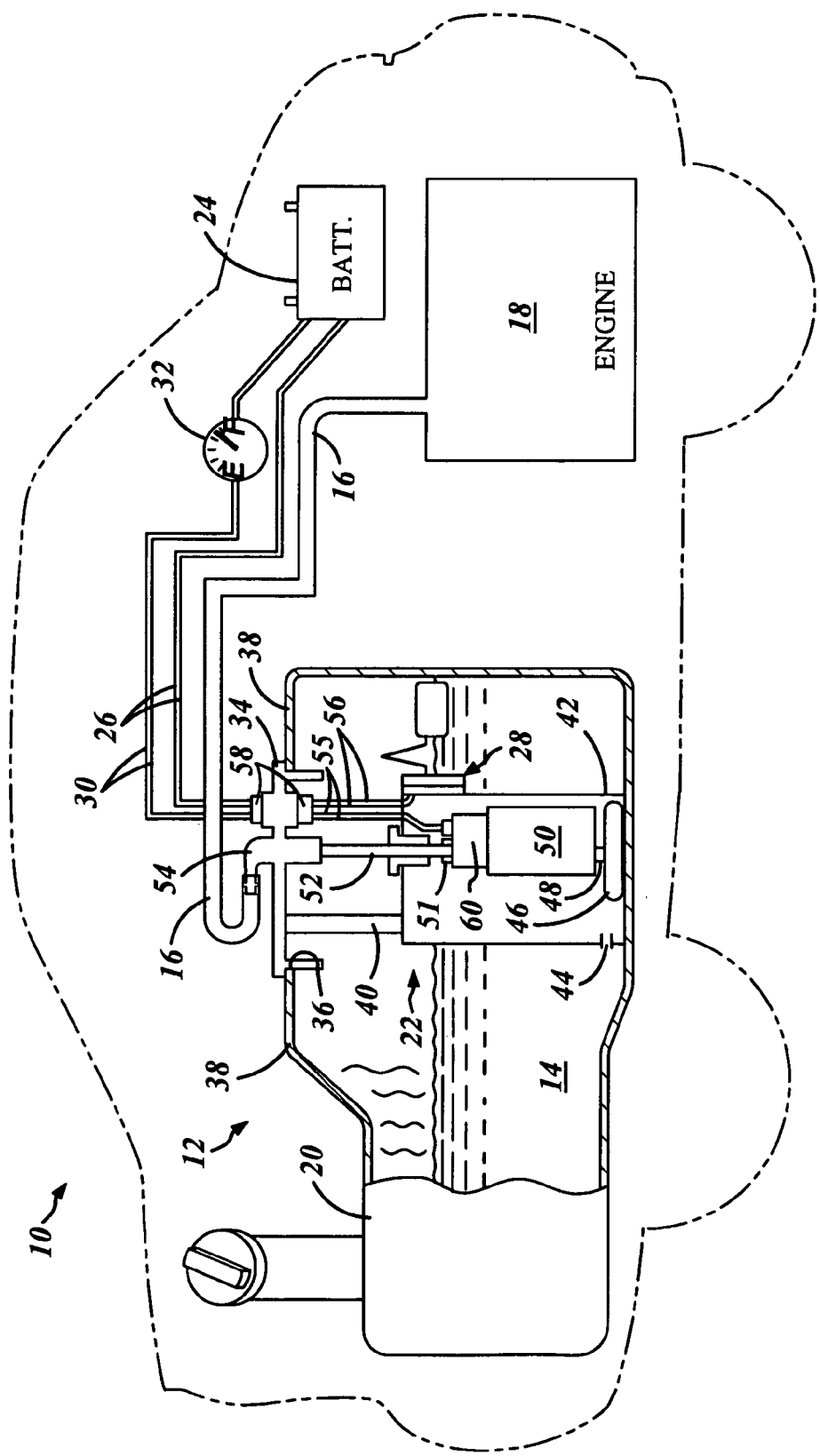
FIG. 1 is a schematic view of a vehicle including a fuel tank assembly including a fuel tank, a fuel delivery module, and a sealed joint therebetween including an exemplary first form of a multi-piece seal between a flange of the fuel delivery module and a wall of the fuel tank.

In general, and before referring to the drawing figures, various exemplary forms of an axial seal are described. The various exemplary forms may be used in any desired application, but are all particularly well-adapted for reducing permeation and evaporative emissions of volatile fuel from escaping through an axial flange joint of a fuel tank assembly of an automobile, or any number of recreational, marine, industrial, garden, and/or agricultural products. The exemplary forms are structurally different, but include a number of features in common. For example, according to the preferred forms disclosed herein, each provides one or both of an orientation feature or a stress-relieving feature, and provides an economical balance of a low-permeation material with relatively inexpensive material having relatively lower-temperature elasticity capability.

Exemplary Embodiment

Referring in detail to the drawings, FIG. 1 schematically illustrates a vehicle 10 including a fuel tank assembly 12 for storing fuel 14 and supplying the fuel 14 through a fuel line 16 to an internal combustion engine 18 that mechanically powers the vehicle 10. The fuel tank assembly 12 includes a fuel tank 20 for housing the fuel 14 and a fuel delivery module or sender unit 22 that is mounted within and to the fuel tank 20, pumps fuel 14 out of the fuel tank 20, and is electrically powered by a vehicle battery 24 via wires 26. The fuel delivery module 22 also includes a float-arm fuel level sensor 28 for sensing the level of the fuel 14 within the fuel tank 20 and sending a signal, via wires 30, indicative of the fuel level to a fuel gage 32 for use or observation by a vehicle driver within a passenger compartment of the vehicle 10.

As generally shown in FIG. 1, the fuel delivery module 22 assembles into an opening 36 through a fuel tank wall 38, wherein a flange 34 of the module 22 is mounted or positioned adjacent or against the fuel tank wall 38, and wherein the flange 34 may be mounted and attached to the fuel tank in any suitable manner but is preferably fastened thereto as will be described herein below. In any case, a fuel reservoir or housing 42 of the fuel delivery module 22 is suspended within the fuel tank 20 from the flange 34, by one or more posts 40. The housing 42 has a fuel inlet 44 to communicate the fuel 14 from within the fuel tank 20 to a fuel filter 46 connected to a fuel inlet 48 of a fuel pump 50. The fuel pump 50 has a fuel outlet 51 that connects to a fuel outlet tube 52 that communicates through a fuel supply fitting 54 of the flange 24 and a fuel line 16 with a manifold and fuel injectors of the engine 18. Electrical leads 55, 56, with associated connectors 58, extend through the flange 34 providing electrical power to an electric motor 60 of the fuel pump 50 and to the fuel level sensor 28. Accordingly, the fuel delivery module 22 is powered by the battery 24 to pump fuel from the fuel tank 20 to the engine 18 and to indicate the level of the fuel within the fuel tank 20 to the fuel gage 32.

The liquid fuel 14 within the fuel tank 20 is composed of highly volatile hydrocarbons that may quickly vaporize and escape to the atmosphere through the flange-type joint between the module 22 and fuel tank 20, if the joint is not suitably sealed. Accordingly, it is desirable to provide a pressure-tight, permeation-free flange-type joint between the module 22 and fuel tank 20, as more specifically shown in FIGS. 2 and 3.

FIG. 2 illustrates an exemplary flange-type joint or flange seal assembly 62 that secures the fuel delivery module 22 to the fuel tank 20. The flange seal assembly 62 includes a ring 64, a multiple-piece static axial seal 66a, the flange 34 of the fuel delivery module 22, and a locking member 68. The ring 64 may be embedded in the fuel tank wall 38 and circumscribes the opening 36.

The flange seal assembly 62 is received in the wall 38 of the plastic fuel tank 20, which may be composed of any suitable fuel tank material such as steel or single-layer plastic, but is preferably composed of multi-layered plastic. As an example, the fuel tank wall 38 may have an outer layer 38a, a permeation barrier layer 38b, and a inner layer 38c, but the wall 38 may include other sub-layers such as adhesive layers to secure the permeation barrier layer 38b to the outer and inner layers, 38a, 38c. Other than the opening 36, the permeation barrier layer 38b is completely encapsulated by the outer and inner layers 38a, 38c, and a portion of the barrier layer 38b is exposed adjacent to and extends continuously around the perimeter of the opening 36.

In assembly, the multi-piece axial seal 66a circumscribes the opening 36 and is preferably disposed in an axially opening circumferential groove 39 in the fuel tank wall 38. Accordingly, the axial seal 66a is a "face seal" or "flange seal". The fuel delivery module 22 is inserted into the opening 36 until an axially-extending annulus 34a of the flange 34 fits in the opening 36 and a radially-extending annulus 34b of the flange 34 is positioned against or just adjacent the fuel tank wall 38 to cover the seal 66a and groove 39 such that the seal 66a is between and in sealingly resilient contact with the flange 34 and the outer layer 38a of the fuel tank wall 38 to provide a seal between them. As will be further described herein below, the locking member 68 is then suitably aligned with the ring 64 and assembled over the flange 34 in circumferential slidable engagement with the ring 64.

As shown in FIG. 3, the ring 64 has a flange 70 that is preferably embedded in and integrally interconnected to the fuel tank wall 38 such as by molding, and an exposed flange 72 that generally projects outside of the fuel tank wall 38. The exposed flange 72 generally extends axially away from the embedded flange 70 and has a plurality of equidistantly spaced tabs 74. For interlocking with the locking member 68, each tab 74 defines a circumferentially extending elongated slot 76. The locking member 68 has a plurality of circumferentially spaced apertures 78 for accepting the tabs 74 of the flange 70 therethrough.

In assembly, the tabs 74 of the ring 64 project through the apertures 78 and, as the locking member 68 is rotated, radially extending flanges 80 of the locking member 68 are received in the slots 76 and thereby retained by the tabs 74 of the ring 64. As shown in FIG. 3, the ring 64 and locking member 68 are further retained in this interlocked position by interengaging projections 82, 84 of the ring 64 and locking member 68 respectively, that are preferably stamped therein. Circumferential interengagement of the locking member 68 with the ring 64 applies an axial force against the flange 34 to compress the resilient seal 66a into firm sealing contact between the fuel module flange 34 and the fuel tank wall 38. Accordingly, the fuel module flange 34 is mounted to the fuel tank wall 38 in the manner set forth above, but may be mounted thereto in any other suitable desired manner.

First Exemplary Form of a Multi-Piece Seal

Figure 4A:
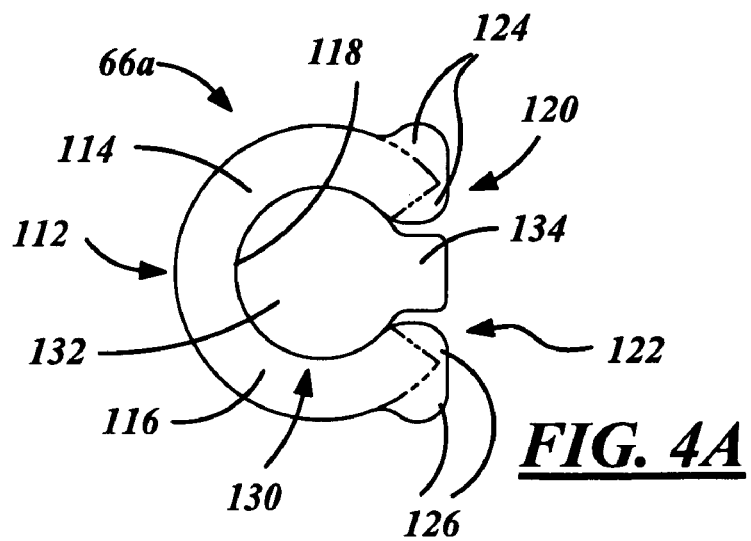
FIG. 4A is a cross section of a portion of the multi-piece seal of FIG. 1, shown in an uncompressed state.

FIG. 4A illustrates, in cross section, the multi-piece seal 66a of FIGS. 2 and 3. The seal 66a is preferably substantially annular, ring-shaped, or circumferentially continuous, is substantially circular in cross section, and includes a substantially C-shaped outer member, jacket, or sheath 112. The sheath 112 is circumferentially continuous and preferably has, in a relaxed or an uncompressed state, a cross-sectional shape defined by substantially semi-circular-shaped halves or portions 114, 116, which define a substantially semi-circular and radially-outwardly open channel 118 and which terminate in free ends 120, 122 preferably having rounded projections or lobes 124, 126 to yield lobed ends, as emphasized by way of the phantom lines.

The seal 66a also includes a reinforcement or energizer in the form of an inner member or core 130 that is preferably assembled to the sheath 112 at least partially within the channel 118 thereof. The core 130 is circumferentially continuous and preferably has, in an uncompressed state, a substantially round cross-sectional shape including a central body 132 with a radiused or rounded projection 134 extending radially therefrom.

The projection 134 is preferably integral with the body 132 and annular in shape, and is provided to prevent or minimize twisting of the core 130 relative to the sheath 112. The projection 134 acts as an orientation feature to minimize twisting of the core 130 during assembly of the seal 66a, wherein the projection 134 serves as a visual aid to enable an assembler to verify that the projection 134 extends between the lobed ends 120, 122 of the sheath 112 along the inner circumference of the seal 66a. The projection 134 also acts as an anti-twisting feature to enable the core 130 to resist twisting or rolling after the core 130 is assembled to the sheath 112, wherein the projection 134 is substantially rotatably trapped between the lobed ends 120, 122 of the sheath 112.

The lobes 124, 126 of the sheath 112 are preferably annular in shape and integral with the semi-circular portions 114, 116 of the sheath 112, and tend to prevent or minimize twisting of the core 130 relative to the sheath 112 and twisting of the entire seal 66a itself. The lobes 124, 126 act, especially when the seal 66a is compressed, to trap the projection 134 to reduce the possibility of the core 130 twisting within the channel 118 of the sheath 112. Also, especially when compressed, the lobes 124, 126 act as reaction members to counter roll or extrusion of the entire seal 66a in a joint between two components when the joint is pressurized.

The lobes 124, 126 also provide additional material, compared to a standard round O-ring, to provide a larger seal face and more completely fill a seal gland or groove. The size of the lobes 124, 126 can be varied as an easy way to vary the compressive load of the seal 66a depending upon the sealing performance desired for a given application. In other words, for a given groove/gland size, the lobes 124, 126 can be reduced in size to yield lower compressive loads, or vice-versa.

The seal 66a may be of any suitable size depending upon the size of the groove or gland and the application in which the seal 66a is to be used. However, as shown, the wall thickness of the semi-circular portions 114, 116, not including the lobed ends, is preferably, smaller than the diameter of the core 130. Accordingly, a substantial amount of the material of the overall seal 66a is composed of a typically less expensive material that makes up the core 130.

The seal 66a may be composed of polymeric materials, but any suitable resilient materials could be used. In particular, the sheath 112 may be composed of a thermoplastic, an elastomer, a composite of a thermoplastic and an elastomer, or preferably may be composed of a relatively high-performance vapor-permeation-resistant polymer such as Viton® (available from DuPont Dow Elastomers of Wilmington, Del.), or the like, with a relatively high FKM fluorocarbon content. The sheath material may preferably contain ⅔ or more FKM with an approximate coefficient of friction of 0.25. Because the sheath material may only provide limited cold-temperature elasticity capability, e.g. to as low as about −15 degrees F., the core 130 is preferably composed of a different material to compensate for the relatively low cold-temperature elasticity performance of the sheath 112.

The core 130 may be composed of any suitable polymer but is preferably composed of a relatively less expensive elastomer compared to the sheath material, such as a liquid-fuel-resistant elastomer like a nitrile elastomer, fluoro-silicone rubber, butylene-nitrol elastomer, or a lower FKM content elastomer. The core material preferably may be approximately a 70 durometer material with an approximate coefficient of friction of 0.10. The core 130 is preferably composed of a material having relatively better cold-temperature elasticity capability to provide overall good low-temperature performance of the seal 66a, at temperatures as low as −40 degrees F. or lower. Accordingly, the preferred C-shape of the seal 66a particularly enables use of a sheath 112 with a minimal amount of a low-permeability elastomer and a core 130 with a balance of less expensive elastomer having relatively better low-temperature elasticity, to provide an efficient and economical solution to PZEV regulations.

For use in fuel systems, the polymeric materials should exhibit suitable resistance to degradation and swelling when in contact with hydrocarbon fuels such as gasoline, gasohol, alcohol, diesel, and the like. The phrase polymeric material generally means relatively high-molecular-weight materials of either synthetic or natural origin and may include thermosets, thermoplastics, and/or elastomers. The term elastomeric generally means a material, which at room temperature, can be stretched under low stress to about twice its original length or more and, upon release of the stress, will return with force to its approximate original length. Elastomeric also encompasses any of various elastic substances resembling rubber, such as a fluorocarbon like Viton®, a nitrile such as acrylonitrile-butadiene, or the like. In general, the materials used for the components may be selected based on their dimensional stability and resistance to swelling and degradation in warm and cold flexible hydrocarbon fuel environments.

Figure 4B:
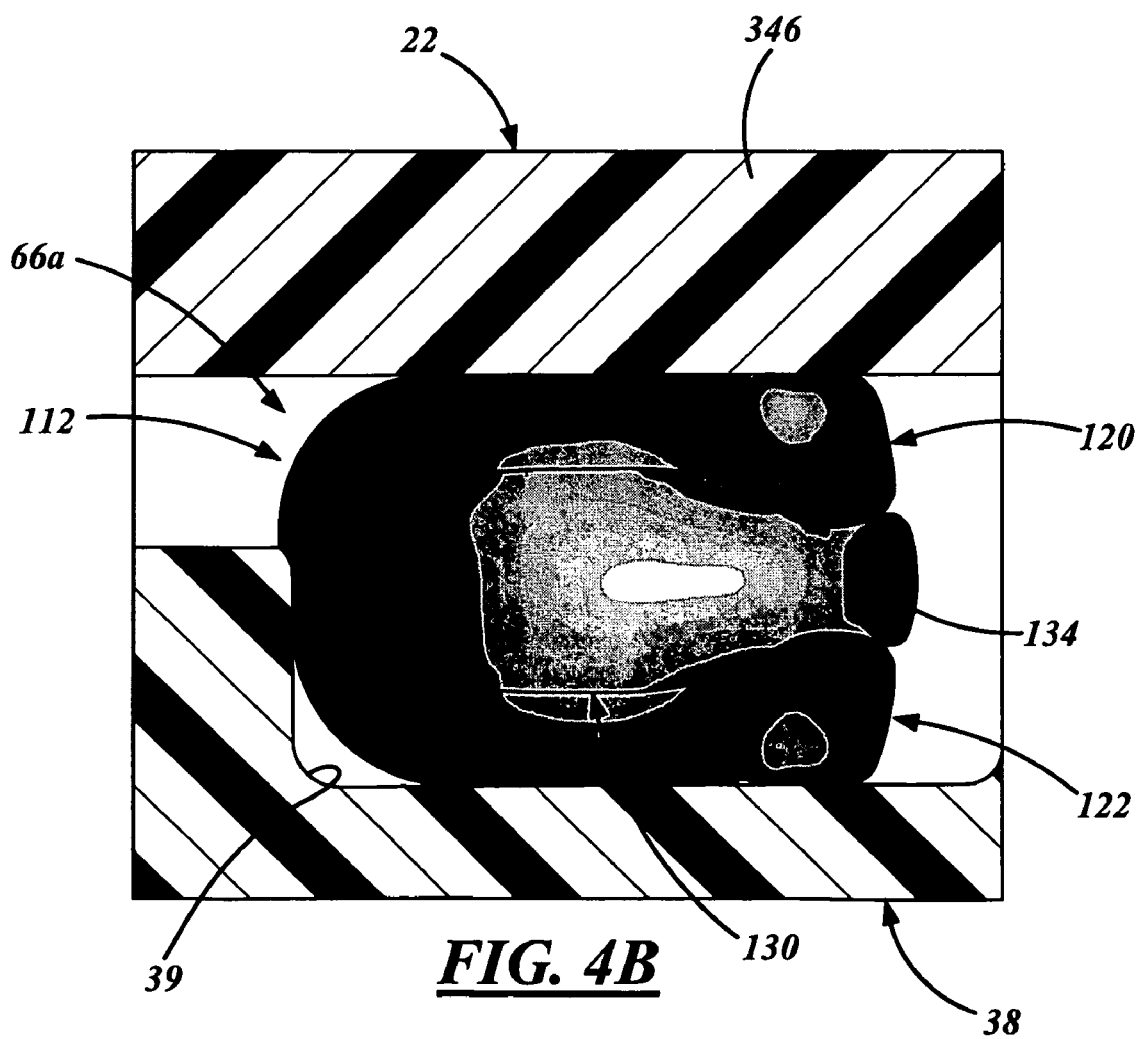
FIG. 4B is a cross section of a portion of the sealed joint of FIG. 1, illustrating the multi-piece seal in a compressed state between the fuel delivery module flange and the fuel tank wall.

FIG. 4B illustrates the seal 66a in a compressed state. The seal 66a is sealingly disposed between the fuel module flange 34 and the fuel tank wall 38, in the groove 39 of the fuel tank wall 38. The most strain in the seal 66e is borne by the core 130, but each of the lobed ends 120, 122 also experience concentrations of strain, as shown. FIG. 4B also shows how the lobed ends 120, 122 trap the projection 134 of the core 130.

Second Exemplary Form

FIG. 5 illustrates another presently preferred form of a multi-piece seal 66b, which is similar in many respects to the form 66a of FIGS. 4A and 4B and like numerals between the forms generally designate like or corresponding elements in the drawing figures. Additionally, the description of the common subject matter will generally not be repeated here.

In this form, the seal 66b includes a substantially C-shaped outer member or sheath 212 having lobes 224, 226 that are reduced in size compared to the previous form of the seal 66a and that have outer radial flats 225. It was discovered during modeling that, under typical compression loads, the reduction in the amount of material of the lobes yields a similar gland fill and resistance to roll and extrusion as the previous form of the seal 66a, yet saves some material cost.

The seal 66b also includes an inner member or core 230 that is disposed in a channel 218 of the sheath 212, is substantially similar to the core 130 of the previous form, and is dressed with a relief 236 in the form of a flat, oriented diametrically opposite its projection 234. The relief 236 acts to reduce the maximum material stress of the core 230 and yields similar performance as using a lower durometer material for the core. In other words, one may vary the compressibility of the core 230, by varying the size of the relief 236—which is similar to varying the durometer of the core material.

Third Exemplary Form

FIG. 6 illustrates another presently preferred form of a multi-piece seal 66c, which is similar in many respects to the forms 66a, 66b of FIGS. 4A and 5 and like numerals between the forms generally designate like or corresponding elements throughout the several views of the drawing figures. Additionally, the description of the common subject matter will generally not be repeated here. In this form, the seal 66c includes the outer member or sheath 212 of the second form and the inner member or core 130 of the first form.

Fourth Exemplary Form

FIG. 7 illustrates another presently preferred form of a multi-piece seal 66d, which is similar in many respects to the forms 66a, 66b, 66c of FIGS. 4A through 6 and like numerals between the forms generally designate like or corresponding elements throughout the several views of the drawing figures. Additionally, the description of the common subject matter will generally not be repeated here.

In this form, the seal 66d preferably includes the sheath 212 of FIG. 5 and an inner member or core 430 that is disposed in the channel 218 of the sheath 212, is substantially similar to the core 230 of FIG. 5, and further incorporates a relief 436 in the form of a V-shaped or annular wedge-shaped void or groove. The relief 436 is circumferentially continuous and open in a radially inward direction diametrically opposite the projection 434. This relief geometry is preferred to reduce the maximum material stress of the core 430 and the size of the relief 436 may be increased or decreased to yield an increase or decrease in compressibility of the seal 66d. Thus, the relief 436 acts to reduce the maximum material stress of the core 430 and yields installation and compression load performance similar to that of a standard O-ring that is substantially the same size as the entire seal 66d and composed of a liquid-fuel-resistant material. In other words, one may vary the compressibility of the core 130, by varying the size and shape of the relief 436—which is similar to varying the durometer of the core material.

Fifth Exemplary Form

FIG. 8 illustrates another presently preferred form of a multi-piece seal 66e, which is similar in many respects to the forms 66a, 66b, 66c, 66d of FIGS. 4A through 7 and like numerals between the forms generally designate like or corresponding elements throughout the several views of the drawing figures. Additionally, the description of the common subject matter will generally not be repeated here.

In this form, the seal 66e preferably includes the sheath 212 of FIG. 5, and an inner member or core 530 that is disposed in the channel 218 of the sheath 212 and that incorporates a circumferentially continuous and radially-outwardly open relief 536 in the form of a V-shaped or annular wedge-shaped groove or void. In this form, the core 530 does not have a radial projection because it was discovered that the relief 536 itself provides some resistance to twisting of the core 530 relative to the sheath 212. Like the projection of previous forms, the relief 536 provides an orientation feature to minimize twisting of the core 530 during assembly of the seal 66e, wherein the relief 536 serves as a visual aid to enable an assembler to verify that the relief 536 is aligned between the lobed ends 220, 222 of the sheath 212 over the inner circumference of the seal 66e.

Sixth Exemplary Form

FIG. 9 illustrates another presently preferred form of a multi-piece seal 66f, which is similar in many respects to the forms 66a, 66b, 66c, 66d, and 66e of FIGS. 4A through 8 and like numerals between the forms generally designate like or corresponding elements throughout the several views of the drawing figures. Additionally, the description of the common subject matter will generally not be repeated here.

In this form, the seal 66f preferably includes a substantially C-shaped outer member or sheath 612. The sheath 612 preferably has, in an uncompressed state, a cross-sectional shape defined by substantially semi-circular-shaped portions 614, 616, which define a substantially semi-circular channel 818 that opens radially outwardly, and which terminate in lobed ends 620, 622. The seal 66f also includes an inner member or core 630 disposed in the channel 618 of the sheath 612 and preferably has, in an uncompressed state, a substantially round cross-sectional shape including a central body 632 with a circumferentially continuous groove or relief 636 provided therein, similar to the previously described relief 536. The relief 636 provides both a stress-relieving and an orientation feature.

Diametrically opposite the relief 636, the core 630 includes an anti-twisting and/or orientation feature or relief 638 that cooperates with an anti-twisting and/or orientation feature or projection 640 of the sheath 612. The features 638, 640 are preferably complimentarily V-shaped, integral with the core 630 and sheath 612 respectively, and circumferentially continuous. When interengaged, the features 638, 640 enable the sheath 612 and core 630 to resist twisting or rolling with respect to one another after the core 630 is assembled to the sheath 612.

One or more of the multi-piece seals of the exemplary forms herein provide the following advantages in comparison, for example, to round cross section unitary O-rings composed of low-permeation material: increased low temperature performance and substantially similar permeation resistance; a cross section that enables ready drop-in replacement for any O-ring face seal application; resists seal roll, extrusion, and separation during pressurization of the seal; improved compliance to irregular seal surfaces; protection against splitting of any external coating due to differential swell of dissimilar materials; similar compression and installation loads as single piece O-rings.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components, elements, or items. Moreover, directional words such as top, bottom, upper, lower, radial, circumferential, axial, lateral, longitudinal, vertical, horizontal, and the like are employed by way of description and not limitation. Other terms are to be construed using their broadest reasonable meaning unless they are used in a context that requires a different interpretation. When introducing elements of the present invention or the forms thereof, the articles "a," "an," "the," and "said" are intended to mean that there are one or more of the elements.

It is to be understood that the foregoing description is not a description of the invention, but is a description of one or more presently preferred forms of the invention. Accordingly, the invention is not limited to the particular exemplary forms disclosed herein, but rather is defined solely by the claims below. In other words, the statements contained in the foregoing description relate to particular exemplary forms and are not to be construed as limitations on the scope of the invention as claimed below or on the definition of terms used in the claims, except where a term or phrase is expressly defined above or where the statement specifically refers to "the invention."

Although the present invention has been disclosed in conjunction with a limited number of presently preferred exemplary forms, many others are possible and it is not intended herein to mention all of the possible equivalent forms and ramifications of the present invention. Other modifications, variations, forms, ramifications, substitutions, and/or equivalents will become apparent or readily suggest themselves to persons of ordinary skill in the art in view of the foregoing description. In other words, the teachings of the present invention encompass many reasonable substitutions or equivalents of limitations recited in the following claims. As just one example, the disclosed structure, materials, sizes, shapes, and the like could be readily modified or substituted with other similar structure, materials, sizes, shapes, and the like. Indeed, the present invention is intended to embrace all such forms, ramifications, modifications, variations, substitutions, and/or equivalents as fall within the spirit and broad scope of the following claims.

What is claimed is:

1. A multi-piece seal comprising:
   a circumferentially continuous outer member having in an uncompressed state a cross-sectional shape defined by a substantially semi-circular-shaped portion with an outer surface and an inner surface that defines a substantially semi-circular channel and that terminates in free ends each having a pair of opposed lobes with one lobe of each pair extending radially outward of the outer surface of the semicircular shaped portion; and
   a circumferentially continuous inner member disposed at least partially in the channel of the outer member and having in an uncompressed state a central body with a substantially round cross-sectional shape with a projection extending generally radially therefrom and received between the free ends with the projection not engaged by the lobes when the seal is uncompressed and in assembly with the seal axially compressed the projection is engaged by the immediately adjacent opposed lobes of the outer member and the distal opposed lobes are axially compressed into sealing engagement.

2. The multi-piece seal of claim 1 wherein the substantially round cross-sectional shape of the body is further defined by a stress-relieving feature.

3. The multi-piece seal of claim 1 which also comprises in the body a circumferentially continuous relief which in cross section is substantially wedge-shaped.

4. The multi-piece seal of claim 1 which also comprises in the body a circumferentially continuous relief which is cross section is a substantially flat portion.

5. The multi-piece seal of claim 1 which also comprises a stress-relief feature disposed in the body of the inner member substantially diametrically opposite the radially-extending projection.

6. The multi-piece seal of claim 5 wherein the relief feature is at least one of a circumferentially continuous flat portion or a wedge-shaped portion of the body of the inner member.

7. The multi-piece seal of claim 1 wherein the outer member is composed of a permeation-resistant polymeric material having a given low-temperature elasticity capability, and the inner member is composed of an elastomeric material having a relatively lower temperature elasticity capability compared to the permeation-resistant polymeric material.

8. The multi-piece seal of claim 7 wherein the outer member is composed of an elastomeric material having greater than $2/3$ fluorine content.

9. A multi-piece seal for receipt between axially spaced-apart circumferential continuous components to provide a seal between the components, comprising:
   a circumferentially continuous outer member having in an uncompressed state a cross-sectional shape defined by a substantially semi-circular-shaped portion with an outer surface and an inner surface that defines a substantially semi-circular channel and that terminates in free ends each having a pair of opposed lobes with one lobe of each pair extending radially outward of the outer surface of the semicircular shaped portion; and
   a circumferentially continuous inner member disposed at least partially in the channel of the outer member and having in an uncompressed state a central body with a substantially round cross-sectional shape with a projection extending generally radially therefrom and received between the free ends with the projection not engaged by the lobes when the seal is uncompressed and in assembly with the seal axially compressed the projection is engaged by the immediately adjacent opposed lobes of the outer member and the distal opposed lobes are axially compressed into sealing engagement with the respective axially spaced-apart components.

* * * * *